June 8, 1965   L. W. JOHNSON   3,187,591
VIBRATING APPARATUS
Filed June 12, 1961

INVENTOR.
LOUIS W. JOHNSON
BY
BUCKHORN, CHEATHAM & BLORE
ATTORNEYS

United States Patent Office 3,187,591
Patented June 8, 1965

3,187,591
VIBRATING APPARATUS
Louis W. Johnson, 3440 Franklin Blvd., Eugene, Oreg.
Filed June 12, 1961, Ser. No. 116,324
5 Claims. (Cl. 74—86)

This invention relates to vibrating apparatus of the type having a rotary shaft equipped with antifriction bearings between it and the part to be vibrated, and the invention relates particularly to the mounting arrangement for such eccentrically loaded antifriction bearings.

Heretofore, it has been the practice in many installations to press the inner race onto the shaft to prevent the inner race from creeping. Creeping of the steel inner race on a steel shaft causes rapid wear. Even with a press fit, the lift expectancy of the bearing is only about one-half of that of a normally loaded bearing because the dynamic load is applied constantly to a small area of the inner race.

I have tried a sliding fit of the inner race on the shaft and provided lubricant, such as oil, around the bearings, but the lubricant would not enter from the edges of the inner race and a dry movement occurred.

In order to accommodate the axial shifting movement of the shaft caused by temperature variations or other causes, it has been the prior practice to provide the outer race of such an antifriction bearing with a sliding fit to enable the bearing to shift as a unit. This requires extremely precise machine work to avoid too tight or too loose a fit.

It is a main object of the present invention to provide a mounting arrangement for an eccentrically mounted and loaded antifriction bearing that substantially decreases the wear occurring on the bearing.

A further object is to provide an arrangement as just described in which a special bushing is provided between the inner race and the shaft, and in which the inner race has a slip fit on the bushing and the outer race has a press fit in its housing, and wherein a fluid lubricant is fed directly to the area between the inner race and the bushing.

A further object is to provide such an arrangement constructed to enable ready removal of the bushing or replacement of the bushing, and also insures proper lubrication for the antifriction bearing.

Another object is to provide an economical and simple means of changing the amplitude of vibration of a vibrating apparatus by exchanging bushings of various eccentricities.

Various other objects of the invention will be apparent from the following description taken in connection with the accompanying drawings wherein.

*General description*

Figure 1:
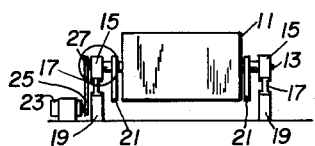
FIG. 1 shows an end view of a vibrating screening apparatus incorporating the concepts of the present invention.

FIG. 1 shows a typical apparatus embodying the concepts of the present invention, the apparatus being a screening machine for granular material. The machine includes a screening box or frame 11 having one or more inclined screens (not shown) to receive granular material to be screened. The suspension system for the box or frame includes springs (not shown) and a shaft 13 journaled in bearing assemblies 15 supported by bolsters 17 in turn supported by a base frame 19. Counterweights 21 fixed to the shaft 13 work in opposition to the weight of the box or frame 11 and the parts and load associated therewith.

Figure 2:
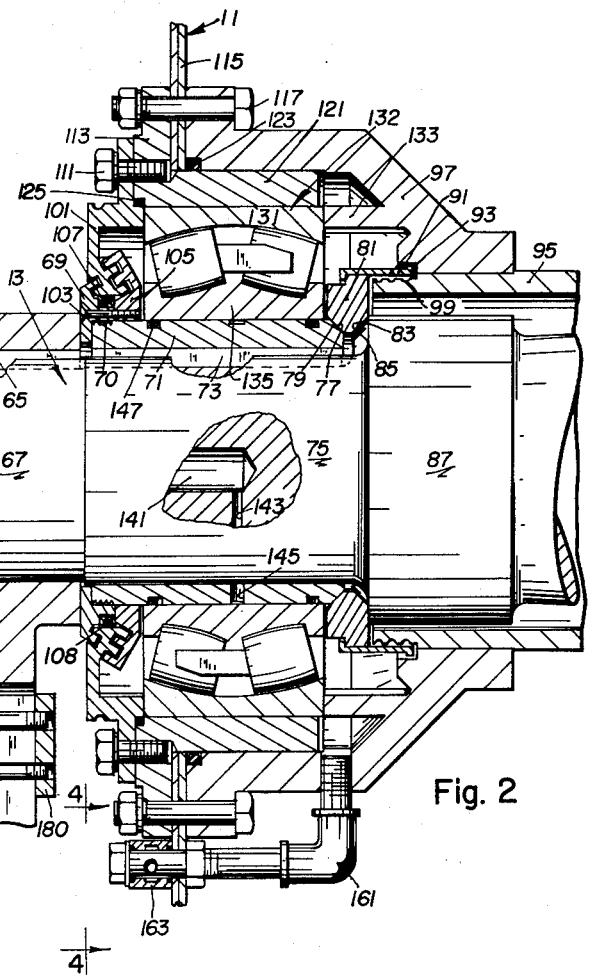
FIG. 2 is an enlarged vertical section taken through the encircled portion of FIG. 1.

The shaft 13 is rotated by a motor 23 through a belt or chain drive 25 which includes a sheave or sprocket 27 fixed on one end of the shaft 13, the left-hand end as the parts are shown in FIGS. 1 and 2.

The shaft carries an eccentric arrangement, to be presently described, which causes vibration of the box 11 upon rotation of the shaft.

*Detail description*

Except for the drive to the left-hand end of the shaft 13, the ends of the shaft and the structure associated therewith are identical, and hence only one end and its associated structure need be described.

Figure 3:
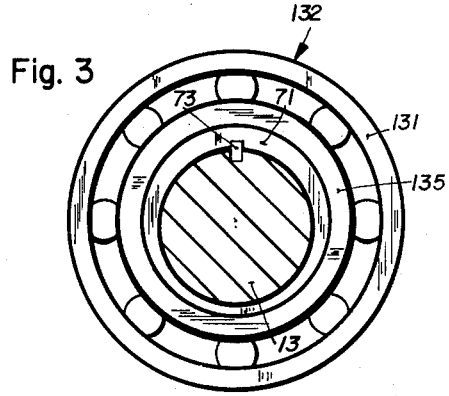
FIG. 3 is an elevational view showing an end of the eccentric bushing and its associated bearing, and showing the shaft for the bushing in section.

Referring to FIG. 2, at its ends, the shaft 13 is of concentric stepped construction and is supported by a pair of antifriction bearings 41, one of which is shown in FIG. 2. The bearing 41 comprises part of a bearing assembly 15 for the shaft 13. The bearing 41 fits on a step 43 of the shaft 13 and fits in a block 45 which is secured to the associated bolster 17. A cover plate 47 on the block 45 clamps the outer race of the bearing 41 against a shoulder provided by a flange 49 of the block 45. A labyrinth seal shown diagrammatically at 51 is formed between the flange 49 and a collar 53 which fits on a step 55 of the shaft 13. A similar seal 57 is formed between the cover plate 47 and a spacer sleeve 59 which fits on the shaft 13 between the step 43 and the sheave or sprocket 27. A nut 61 threads on the step 43 and bears against the inner race of the bearing 41 to apply a clamping force to the right against the inner race and in seriatim against a number of elements to the right of the inner race. These elements include the collar 53, previously mentioned, which bears against the washer 63 which in turn bears against the hub 59 of the counterweight 21. The hub 59 is keyed at 65 to a step 67 of the shaft 13 and bears at its right-hand end against the flange portion of an annular outer labyrinth seal member 69. The member 69 fits over a threaded portion 70 on the left-hand end of a nodular iron eccentric bushing sleeve 71. The bushing is keyed at 73 to a step 75 of the shaft 13 to locate the high point of the eccentric bushing 180 degrees from the counterweight 21 as is evident from a comparison of FIGS. 2 and 3. The right-hand end of eccentric sleeve or bushing 71 is beveled at 77 to fit against the bevel 79 on a thrust washer 81. The washer has a second bevel face 83 bearing against a bevel shoulder 85 of a stepped portion 87 of the shaft 13.

The above described bevels are preferably disposed at 45 degrees and these bevels locate the thrust washer 81 in concentric relation to the outer diameter of the bushing 71, even if bushings of different eccentricity are provided.

The outer surface of the thrust washer 81 supports the left-hand end of a ring type labyrinth member 91. The right-hand end of the member 91 is disposed in an annular groove 93 provided by a shaft housing member 95 and a bearing housing member 97 which are rigidly secured together. The left-hand end of the tubular shaft housing member 95 terminates short of the thrust washer 81 and is formed with a number of external grooves 99 to aid in retaining a lubricant within the bearing housing 97 from travel to the right.

Now returning to the member 69, this member has an angular flange interfitting with an annular cover member 101 and has through-screws 103 drawing an inner labyrinth member 105 against the first labyrinth member 69. A bronze gland ring 107 fits between the members 69, 101 and 105. The ring is radially channeled to receive an O-ring 108 of oil resistant synthetic rubber. The inner labyrinth member 105 has angular flanges interfitting with similar flanges on the member 101. Further mention of the member 105 will be made presently.

The cover member 101 is secured by bolts 111 to an adapter member 113 which is clamped against the side face of the associated wall 115 of the box or frame 11 by nuts and bolts 117. These nuts and bolts also clamp the bearing housing member 97 to such wall.

The bearing adapter has a cylindrical portion 121 projecting inwardly through an opening in the side wall 115 and projecting within the left-hand end of the bearing housing 97. An O-ring seal 123 is provided between the portion 121 and the bearing housing. An O-ring seal 125 is provided between the adapted and the cover plate 101.

The inner curved surface of the portion 121 is machined to have a press fit with the outer race 131 of a spherical, roller type, antifriction bearing generally indicated by the reference numeral 132. The cover 101 clamps the outer race 131 against the annular flange portion 133 of the bearing housing 97. The flange is interrupted at places therearound to allow free circulation and draining of lube oil. This generally centers the inner race 135 of the self-aligning bearing between the inner labyrinth member 105 and the thrust washer 81. The parts are so dimensioned that the end faces of the inner race are spaced from the member 105 and the thrust washer 81.

The inner race has a slip fit on the eccentric bushing 71 and because of this and the spaces between the inner race 135 and the member 105 and the thrust washer 81 the shaft may expand axially due to temperature variations without interference by or damage to the antifriction self-aligning bearing 132.

A fluid lubricant is supplied to the area between the inner race 135 and the bushing 71 through a passage which includes a large axial reservoir portion 141 extending inwardly from the adjacent end of the shaft 13, a radial portion 143 which leads to the surface of the shaft 13, and a second radial portion 145 in the bushing which is disposed in register with the portion 143. Spaced O-ring seals 147 retain the fluid lubricant against escape past the end portions of the inner race 135 and hence prevent dry movement between the inner race and the bushing.

A nipple 151 threads into the left-hand end of the lubricant passageway 141 to enable a lubricant to be ejected into the passage.

It has been previoushly mentioned that there is a fluid lubricant within the bearing housing 97, but this fluid lubricant would not be sufficient to lubricate the area between the inner race 135 and the bushing 71 because the lubricant simply will not enter between the inner race and the bushing.

Figure 4:
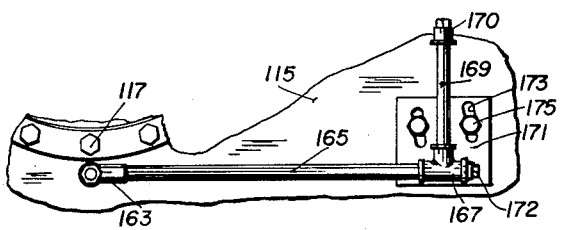
FIG. 4 is a fragmentary elevational view taken in the direction of the arrows 4—4 of FIG. 2.

Referring to FIGS. 2 and 4, there is a lubricant level indicating device provided for the bearing housing 97 which includes a composite conduit 161 threaded into a hole in the bearing housing and also extending through a hole in the wall 115. A fluid tight swivel joint 163 fits on the projecting portion of the conduit 161 and a horizontal conduit section 165 extends from the joint 163 and is connected to a joint 167. A vertical pipe 169 is connected to joint 167 and extends upwardly therefrom. The cap 170 for the pipe has a depending dip stick to enable checking the oil level. A reservoir, not shown, but mounted on the base frame of the machine could be provided and equipped with a flexible line extending to the plugged end 172 of the joint 167. Oil could then be checked, added, or be circulated by a pump (not shown) while the machine is running.

The joint 167 is secured to an adjustment plate 171 which is formed with arcuate slots 173 receiving bolts 175 securing the plate to the wall 115. When the angle of the frame or box 11 is changed, the plate 171 is adjusted accordingly to maintain a proper oil level in the bearing housing 97.

Returning now to the eccentrically mounted bearing 132, as the shaft 13 is rotated, the eccentric busing 71 will cause the mass of the box or frame 11 and the parts and the load carried thereby to vibrate. The dynamic load created by vibrating such mass will be in register with the high point or area of the bushing and thus travel circumferentially around the axis of the shaft 13. Since the outer race 131 of the bearing 132 is in fixed relation to the frame 11, the dynamic load is distributed uniformly around the outer race.

Insofar as the inner race 135 of the bearing 132 is concerned, it usually turns with the shaft 13 and thus the dynamic load is not distributed uniformly in the same manner around the inner race as occurs in the case of the outer race. However, because of the slip fit of the inner race on the bushing 71, during starting or stopping of the machine, the inner race may creep or slide circumferentially on the bushing so that while one portion of the inner race may be under a relatively constant dynamic load during one period of operation, the shifting or creeping at the end of such period will locate another portion of the inner race in position to accept the dynamic load of the next period. Thus uniformity of loading of the inner race over a number of periods of operation is achieved.

The bushing 71 can be removed without removing the cover 101, the bearing 132, or the inner labyrinth member 105. To accomplish the removal, the frame is blocked up or otherwise independently supported, and the parts to the left of the outer member 101 are removed from the shaft 113. A tube (not shown) is passed over the shaft end and threaded on the threads 70. A pulling force is then exerted on the tube to remove the bushing. Another bushing may be readily inserted by passing it over the shaft end and pushing it between the inner race 135 and the step 75 of the shaft 13.

When another bushing of different eccentricity is used, the weights 180 of the counterweight units 21 are altered, by adding or removing weights, to maintain balance.

The bearing design of this application is applicable to practically any eccentrically loaded bearings, particularly where heavily loaded, such as jaw type rock crushers, dead axled vehicles, crank pins and crankshaft bearings.

Having described the invention in what is considered to be the preferred embodiment thereof, it is desired that it be understood that the invention is not to be limited other than by the provisions of the following claims.

I claim:
1. In a vibrating apparatus,
a body to be vibrated but restrained against rotation,
a shaft for said body, means supporting said shaft for rotation about a fixed predetermined axis,
means for rotating said shaft,
a self-aligning antifriction bearing having its outer race received by said body,
an eccentric bearing sleeve disposed between said shaft and the inner race of said bearing,
means preventing rotation of said sleeve on said shaft,
and means for conducting a lubricant to the area between said sleeve and the inner race of said bearing,
the outer race of said bearing having a press fit in said body so that as said sleeve is rotated, the dynamic load created by said eccentric sleeve will be distributed about said outer race,
said inner race having a slip fit on said sleeve so that relative movement circumferentially between said inner race and asid sleeve can occur to distribute the dynamic load about said inner race, whereby said dynamic load is distributed circumferentially about both races, said lubricant conducting means including a passage in said shaft and leading to an aligned passage in said sleeve which leads to the interior of said inner race whereby circumferential movement of said inner race on said sleeve serves to bring the entire inner surface of the inner race past the aligned passages to receive lubricant therefrom.

2. In a vibrating apparatus,
a body to be vibrated but restrained against rotation,
a shaft for said body, means supporting said shaft for rotation,
means for rotating said shaft,
an antifriction bearing having its outer race received by said body,
an eccentric bearing sleeve disposed between said shaft and the inner race of said bearing,
means preventing rotation of said sleeve on said shaft,
the outer race of said bearing having a press fit in said body so that as said sleeve is rotated, the dynamic load created by said eccentric sleeve will be distributed about said outer race,
said inner race having a slip fit on said sleeve so that relative movement circumferentially between said inner race and said sleeve can occur to distribute the dynamic load about said inner race, whereby said dynamic load is distributed circumferentially about both races, movement limiting means for said inner race comprising spaced collar means surrounding said shaft and clamped in abutting engagement against the end faces of said sleeve to dispose the inner end faces of said collar means in spaced relation with respect to the opposed end faces of said inner race, whereby to enable said inner race to shift a limited extent in an axial direction on said sleeve.

3. In a vibrating apparatus,
a body to be vibrated but restrained against rotation,
a shaft for said body, means supporting said shaft for rotation,
means for rotating said shaft,
an antifriction bearing having its outer race received by said body,
an eccentric bearing sleeve disposed between said shaft and the inner race of said bearing,
means preventing rotation of said sleeve on said shaft,
the outer race of said bearing having a press fit in said body so that as said sleeve is rotated, the dynamic load created by said eccentric sleeve will be distributed about said outer race,
said inner race having a slip fit on said sleeve so that relative movement circumferentially between said inner race and said sleeve can occur to distribute the dynamic load about said inner race, whereby said dynamic load is distributed circumferentially about both races,
means engageable with the inner and outer races of said bearing for retaining said bearing in place,
means on said sleeve for attaching a tool to facilitate an axial pulling force being applied to said sleeve to enable it to be removed while said bearing is retained in place.

4. In an apparatus having
a shaft,
a replaceable eccentric bushing removably fitting on said shaft,
means on said shaft presenting an annular bevel surface facing the direction of removal of said bushing,
said bushing having an annular bevel surface facing in the direction of said means,
and an annular member between said bushing and means and surrounding said shaft in spaced relation thereto,
said member having oppositely facing bevel surfaces concentric with the outer surface of said bushing and engaging the before mentioned bevel surfaces to automatically locate said member concentric with the outer surface of said bushing.

5. A vibrating apparatus as set forth in claim 1 in which there are axially spaced sealing means between the inner race and said sleeve disposed on opposite sides of the aforementioned passage in said sleeve to prevent the escape of lubricant past the end faces of said inner race.

References Cited by the Examiner
UNITED STATES PATENTS

| | | | |
|---|---|---|---|
| 1,886,966 | 11/32 | Meyer | 308—207 X |
| 1,928,114 | 9/33 | Scheffler | 308—207 |
| 1,942,954 | 1/34 | Cook | 308—236 X |
| 1,949,703 | 3/34 | Wettlaufer | 74—61 |
| 1,999,891 | 4/35 | Buckwalter | 308—236 X |
| 2,008,296 | 7/35 | Soldan | 74—87 |
| 2,102,375 | 12/37 | Morton | 308—236 |
| 2,227,617 | 1/41 | Yardley | 308—236 |
| 2,304,573 | 12/42 | Kessler | 74—61 X |
| 2,599,496 | 6/52 | Soldan | 74—87 |
| 2,714,538 | 8/55 | Hornbostel | 308—236 X |
| 2,728,614 | 12/55 | Rink | 74—61 X |
| 2,817,142 | 12/57 | Boden et al. | 308—236 X |
| 2,902,868 | 9/59 | Ferrara | 74—87 |
| 2,964,186 | 12/60 | Ferrara | 209—366.5 |
| 3,099,349 | 7/63 | Sinden | 74—571 X |

BROUGHTON G. DURHAM, *Primary Examiner.*